United States Patent
Liu et al.

(10) Patent No.: US 11,540,252 B2
(45) Date of Patent: Dec. 27, 2022

(54) DATA TRANSMISSION METHOD, NETWORK DEVICE

(71) Applicant: GUANGDONG OPPO MOBILE TELECOMMUNICATIONS CORP., LTD., Guangdong (CN)

(72) Inventors: Jianhua Liu, Guangdong (CN); Shukun Wang, Guangdong (CN); Haorui Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/337,222

(22) Filed: Jun. 2, 2021

(65) Prior Publication Data

US 2021/0289469 A1 Sep. 16, 2021

Related U.S. Application Data (63) Continuation of application No. PCT/CN2019/109683, filed on Sep. 30, 2019.

(30) Foreign Application Priority Data

Jun. 18, 2019 (WO) ................ PCT/CN2019/091720

(51) Int. Cl.
*H04W 68/02* (2009.01)
*H04W 76/30* (2018.01)
(Continued)

(52) U.S. Cl.
CPC ............. *H04W 68/02* (2013.01); *H04W 8/24* (2013.01); *H04W 76/10* (2018.02); *H04W 76/30* (2018.02)

(58) Field of Classification Search
CPC ..... H04W 68/02; H04W 76/30; H04W 76/10; H04W 8/24; H04W 24/02;
(Continued)

(56) References Cited

U.S. PATENT DOCUMENTS 10,667,323 B1 * 5/2020 Shih .................. H04W 72/0493
2013/0227381 A1 * 8/2013 Akkarakaran .......... H04L 1/004
714/807

(Continued)

FOREIGN PATENT DOCUMENTS

| CN | 109526008 A | 3/2019 |
| CN | 109526008 A * | 3/2019 |

(Continued)

OTHER PUBLICATIONS

3GPP TSG-RAN WG3 Meeting #103 R3-190803 "UP Solution for NB-IoT MT EDT" Ericsson Feb. 25, 2019 (Year: 2019).*

(Continued)

*Primary Examiner* — Matthew C Sams
(74) *Attorney, Agent, or Firm* — Perkins Coie LLP (57) ABSTRACT

Disclosed in the present invention are a data transmission method and a network device. The method comprises: sending first information to a second network device, the first information being used to assist the second network device to determine whether to perform early sending of called data targeting a terminal.

13 Claims, 5 Drawing Sheets

(51) Int. Cl.
*H04W 76/10* (2018.01)
*H04W 8/24* (2009.01)

(58) Field of Classification Search
CPC . H04W 74/0833; H04W 76/27; H04W 88/02; H04W 88/08; H04W 48/12; H04W 72/14; H04L 5/00
See application file for complete search history.

(56) References Cited

U.S. PATENT DOCUMENTS

| | | | |
|---|---|---|---|
| 2018/0324869 A1* | 11/2018 | Phuyal | H04W 72/14 |
| 2018/0359786 A1* | 12/2018 | Phuyal | H04W 48/20 |
| 2019/0104553 A1 | 4/2019 | Johansson et al. | |
| 2019/0141515 A1* | 5/2019 | Kim | H04W 52/0229 |
| 2019/0159197 A1 | 5/2019 | Shrestha et al. | |
| 2019/0342800 A1* | 11/2019 | Sirotkin | H04B 17/318 |
| 2021/0076306 A1* | 3/2021 | Tamura | H04W 48/02 |

FOREIGN PATENT DOCUMENTS

| | | | | |
|---|---|---|---|---|
| CN | 109863783 A | | 6/2019 | |
| CN | 112740743 A | * | 9/2019 | ............ H04W 24/02 |
| CN | 110351833 A | * | 10/2019 | .......... H04W 72/048 |
| CN | 110366208 A | * | 10/2019 | ............ H04W 74/00 |
| WO | WO-2018199673 A1 | * | 11/2018 | ............ H04W 28/02 |
| WO | WO-2019032222 A1 | * | 2/2019 | ........ H04W 74/0833 |
| WO | 2019082122 A1 | | 5/2019 | |
| WO | WO-2019098118 A1 | * | 5/2019 | ............ H04W 12/08 |
| WO | WO-2019232732 A1 | * | 12/2019 | .......... H04W 68/005 |
| WO | WO-2020067970 A1 | * | 4/2020 | ............ H04W 76/10 |
| WO | WO-2020149595 A1 | * | 7/2020 | ............ H04W 74/08 |
| WO | WO-2020222520 A1 | * | 11/2020 | .......... H04W 68/005 |
| WO | WO-2020223633 A1 | * | 11/2020 | |
| WO | WO-2020252659 A1 | * | 12/2020 | ............ H04W 24/02 |
| WO | WO-2020252981 A1 | * | 12/2020 | ............ H04W 24/02 |
| WO | WO-2021074859 A1 | * | 4/2021 | ............ H04W 28/16 |

OTHER PUBLICATIONS

3GPP TS 23.501 V16.0.0 (Mar. 2019), 3rd Generation Partnership Project; Technical Specification Group Services and System Aspects; System Architecture for the 5G System Stage 2 (Release 16).

3GPP TS 23.502 V15.0.0 (Dec. 2017), 3rd Generation Partnership Project; Technical Specification Group Services and System Aspects; Procedures for the 5G System Stage 2 (Release 15).

OPPO. "Introduction of MT-EDT" 3GPP TSG-SA WG2 Meeting #134 S2-1907242, Jun. 28, 2019 (Jun. 28, 2019), sections 5.31.18, 5.31.4.

Huawei et al. "Overall procedure for Msg4 based option" 3GPP TSG-RAN WG2 Meeting #106 R2-1906154, May 17, 2019 (May 17, 2019), sections 1-2.

Huawei et al. "Overall procedure for Msg2 based option" 3GPP TSG-RAN WG2 Meeting #106 R2-1906153, May 17, 2019 (May 17, 2019), sections 1-2.

ZTE Corporation et al. "Further discussion on Msg4-based solution for MT EDT" 3GPP TSG-RAN2 meeting#106 R2-1905899, May 17, 2019 (May 17, 2019), sections 1-2.

Ericsson. "MT early data transmission indication in Msg4 for NB-IoT" 3GPP TSG-RAN3 Meeting #103 R3-190802, Mar. 1, 2019 (Mar. 1, 2019), sections 1-2.

International Search Report in the international application No. PCT/CN2019/109683, dated Mar. 18, 2020.

International Search Report in the international application No. PCT/CN2019/091720, dated Feb. 26, 2020.

Ericsson:"MT early data in Msg4", 3GPP Draft; R2-1906929—MT Early Data in MSG4, 3rd Generation Partnership Project, RAN WG2 Reno, Nevada, USA; May 13, 2019-May 17, 2019 May 13, 2019 (May 13, 2019),XP051730381. 8 pages.

Ericsson:"MT EDT indication in Paging", 3GPP Draft; R3-193018 MT EDT Indication in Paging 3rd Generation Partnership Project, RAN WG3 Reno, U.S.; May 13, 2019-May 17, 2019 May 13, 2019 (May 13, 2019),XP051732279. 3 pages.

Intel Corporation:"Details on MT EDT for UP solution (Msg4-based)", 3GPP Draft; R2-1906434 MT UP-EDT, 3rd Generation Partnership Project, RAN WG2, Reno, USA; May 13, 2019-May 17, 2019 May 13, 2019(May 13, 2019), XP051729899. 6 pages.

LG Electronics Inc:"Further discussion on MT-EDT" 3GPP Draft•R3-192908, 3rd Generation Partnership Project, RAN WG3, Reno, NV,USA; May 13, 2019-May 17, 2019 May 13, 2019(May 13, 2019), XP051732171. 4 pages.

LG Electronics Inc:"Msg2 based MT EDT solution", 3GPP Draft;R2-1907874 MSG2 Based MT EDT Solution 3rd Generation Partnership Project, RAN WG2, Reno, USA; May 13, 2019-May 17, 2019 May 13, 2019(May 13, 2019), XP051731300. 3 pages.

Supplementary European Search Report in the European application No. 19933993.8, dated Dec. 20, 2021. 12 pages.

Office Action of the Indian application No. 202127038769, dated Mar. 31, 2022. 6 pages with English translation.

First Office Action of the European application No. 19933993.8, dated Aug. 9, 2022 (6 pages).

First Office Action of the Chinese application No. 202110576458.1, dated Sep. 2, 2022 with English translation (21 pages).

* cited by examiner

FIG. 1

First information is transmitted to a second network device — 21

FIG. 2

First information transmitted by a first network device is received — 31

DATA TRANSMISSION METHOD, NETWORK DEVICE

CROSS-REFERENCE TO RELATED APPLICATION

The application is a continuation application of a continuation of International Application No. PCT/CN2019/109683 filed on Sep. 30, 2019, which claims the priority of PCT Application No. PCT/CN2019/091720 filed on Jun. 18, 2019. The disclosures of both applications are incorporated by reference herein in their entireties.

TECHNICAL FIELD

The present disclosure relates to the technical field of information processing, and more particularly, to a data transmission method and a network device.

BACKGROUND

In a communication system, when a network side transmits downlink data to a terminal, such as when the network side transmits called data, one of the scenarios is that when the terminal is in an idle state and the called data is required to be transmitted, the data arrives at a core network, and the core network transfers the terminal to a connection state by paging the terminal, and then transmits the called data to the terminal.

However, this conventional data transmission method cannot ensure that the called data is transmitted more quickly, therefore signaling overhead cannot be reduced, and processing efficiency of the system cannot be improved.

SUMMARY

To solve the above technical problem, embodiments of the present disclosure provide a data transmission method and a network device.

In a first aspect, a data transmission method is provided. The data transmission method is applied to a first network device and includes the following operations.

First information is transmitted to a second network device;

Herein the first information is used to assist the second network device in determining whether to perform early transmission of called data for a terminal.

In a second aspect, a data transmission method is provided. The data transmission method is applied to a second network device and includes the following operations.

First information transmitted by a first network device is received;

The first information is used to assist the second network device in determining whether to perform early transmission of called data for a terminal.

In a third aspect, a first network device is provided. The device includes a processor; a memory for storing computer programs; and a transceiver, herein the processor is configured to execute the computer programs stored in the memory to transmit first information to a second network device. Herein, the first information is used to assist the second network device in determining whether to perform early transmission of called data for a terminal.

DETAILED DESCRIPTION

In order to understand the features and technical contents of the embodiments of the present disclosure in more detail, the implementation of the embodiments of the present disclosure will be described in detail with reference to the accompanying drawings, which are provided for purposes of illustration only and are not intended to limit the embodiments of the present disclosure.

The technical solution in the embodiments of the present disclosure will be described with reference to the accompanying drawings of the embodiments of the present disclosure. It is apparent that the described embodiments are a part of the embodiments, not all of the embodiments. Based on the embodiments in the present disclosure, all other embodiments obtained by a person skilled in the art without creative effort fall within the protection scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, a 5G system and the like.

Figure 1:
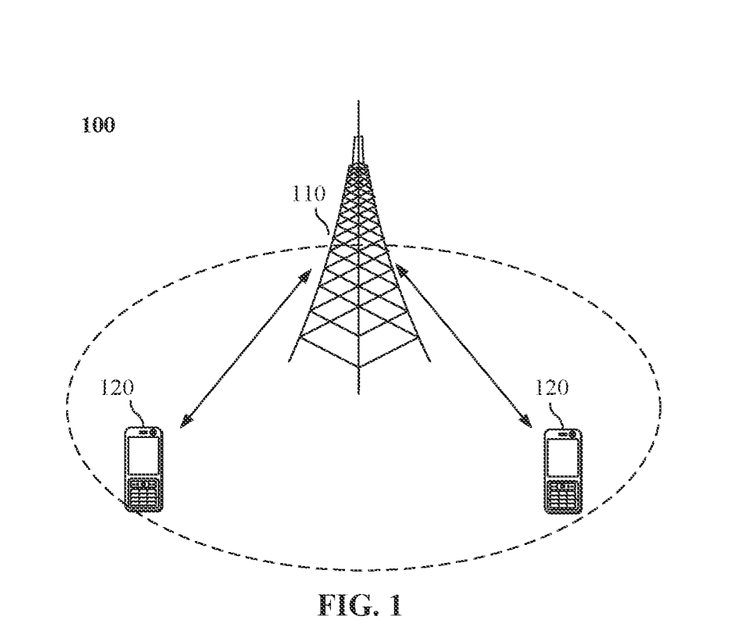
FIG. 1 is a first schematic diagram of a communication system architecture according to an embodiment of the present disclosure.

Exemplarily, communication system 100 to which the embodiments of the present disclosure is applied may be illustrated in FIG. 1. The communication system 100 may include a network device 110, which may be a device communicating with a UE 120 (also referred to as a communication terminal, terminal). The network device 110 may provide communication coverage for a specific geographic area and may communicate with UEs located within the coverage area. Alternatively, the network device 110 may be a Base Transceiver Station (BTS) in a GSM system or a CDMA system, a NodeB (NB) in a WCDMA system, an evolved Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future evolved Public Land Mobile Network (PLMN), and the like.

The communication system 100 also includes at least one UE 120 located within the coverage of the network device 110. The "UE" used herein includes but is not limited to connection via wired lines, such as Public Switched Telephone Networks (PSTN), Digital Subscriber Line (DSL), digital cables, direct cable connections; and/or another data connection/network; and/or via a wireless interface, such as for a cellular network, a Wireless Local Area Network (WLAN), a digital television network such as DVB-H network, a satellite network, a AM-FM broadcast transmitter; and/or means of another UE arranged to receive/transmit communication signals; and/or Internet of Things (IoT) devices. A UE configured to communicate via a wireless interface may be referred to as a "wireless communication terminal". "wireless terminal" or "mobile terminal".

Optionally. Device to Device (D2D) communication may be performed between the UE 120.

It is to be understood that terms "system" and "network" are used interchangeably herein. Term "and/or" as used herein, is merely an association relationship describing associated object and means that there may be three relationships, e.g., A and/or B, which may mean that A alone, both A and B, and B alone. In addition, the character "/" herein generally indicates that the associated object is an "or" relationship.

In order to understand the features and technical contents of the embodiments of the present disclosure in more detail, the implementation of the embodiments of the present disclosure will be described in detail with reference to the accompanying drawings, which are provided for purposes of illustration only and are not intended to limit the embodiments of the present disclosure.

Figure 2:
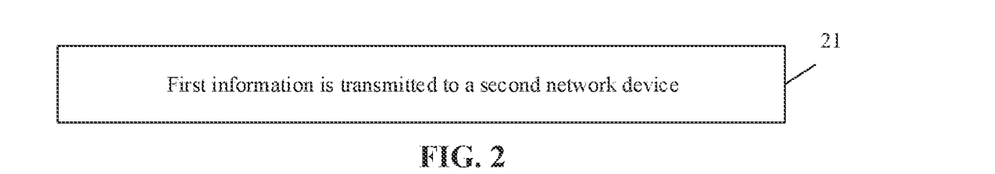
FIG. 2 is a first schematic flowchart of a data transmission method according to an embodiment of the present disclosure.

An embodiment of the present disclosure provides a data transmission method applied to a first network device, as shown in FIG. 2, the method includes the following operations.

In S21: first information is transmitted to a second network device.

The first information is used to assist the second network device in determining whether to perform early transmission of called data for a terminal.

Figure 3:
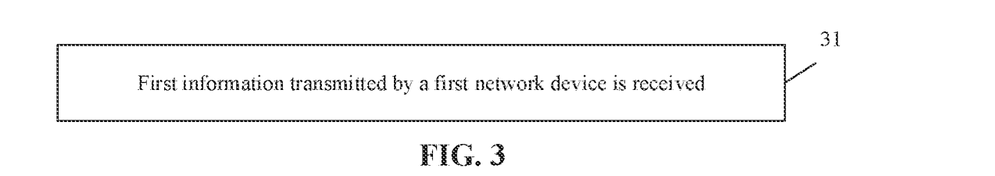
FIG. 3 is a second schematic flowchart of a data transmission method according to an embodiment of the present disclosure.

Accordingly, a data method on the second network device side, as shown in FIG. 3, includes the following operations.

In S31: the first information transmitted by the first network device is received:

The first information is used to assist the second network device in determining whether to perform the early transmission of called data for a terminal.

In the embodiment, the first network device may be a core network device, and the second network device may be an access network device. Specifically, the first network device may be an Access and Mobility Management Function (AMF) or a Mobility Management Entity (MME); the second network device may be a radio access network (RAN), such as a base station therein. Other physical devices may also exist as the first network device or the second network device, no further description will be given here.

Figure 4:
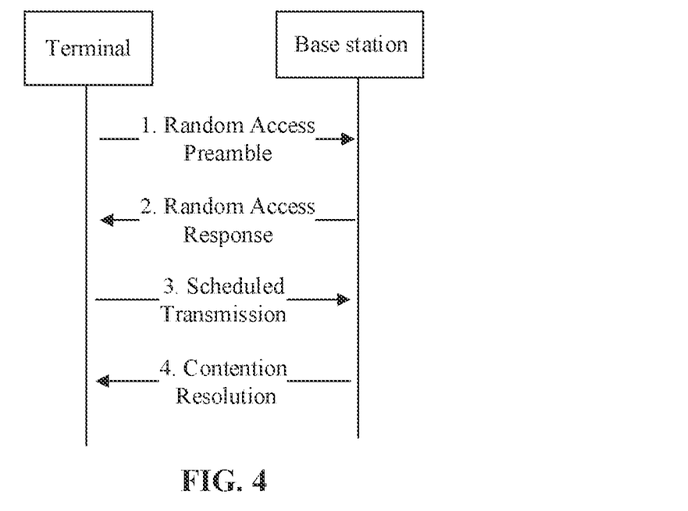
FIG. 4 is a schematic flowchart of a paging process.

In the embodiment, the early transmission of called data can be a way to transmit downlink data during an RCC connection establishment process initiated by the terminal. The access network device, for example, the base station may transmit the downlink data (also referred to as called data) in operation 2 or operation 4 shown in FIG. 4.

The first information includes at least one of:

indication information of whether the early transmission is applicable; that is, the first network device indicates the second network device whether the early transmission of called data may be performed; or capability information of the terminal.

The capability information of the terminal includes: support or nonsupport for the early transmission of called data; and wireless capability information of the terminal.

It can be understood that after the first network device transmits the first information to the second network device, the second network device can determine whether the early transmission of called data can be performed, based on the indication information of whether the early transmission is applicable in the first information.

Alternatively, based on the capability information of the terminal, it may be determined whether the terminal supports the early transmission of called data. If the terminal supports the early transmission of called data, the second network device can determine that the early transmission of called data can be performed. Otherwise, the early transmission of called data cannot be performed.

Alternatively, when the first information transmitted by the first network device includes the indication information of whether the early transmission is applicable and the capability information of the terminal, the second network device may determine whether the early transmission of called data can be performed in combination with the indication information of whether the early transmission is applicable. In addition, it is determined whether the terminal has a capability of supporting the early transmission of called data in combination with the capability information of the terminal, if the terminal has the capability, it can be confirmed that the early transmission of called data can be performed. Otherwise, it can be confirmed that the early transmission of called data cannot be performed. In other words, in this case, it can be confirmed that the early transmission of called data can be performed when two conditions are met.

Before the first network device transmits the first information, the first network device further needs to acquire the capability of the terminal. Specifically, the method for acquiring the capability of the terminal may include the following operations.

A second message transmitted by the terminal is received, and the capability of the terminal about support or nonsupport for the early transmission of called data is determined based on the second message.

Alternatively, the capability of the terminal about support or nonsupport for the early transmission of called data is acquired from the stored wireless capability set of the terminal.

In the first manner, the second message transmitted by the terminal is received, and the capability of the terminal about support or nonsupport for the early transmission of called data is determined based on the second message, the second message may be Non-Access Stratum (NAS) message. In other words, the terminal transmits the NAS message to the first network device, i.e., the core network, to indicate whether the terminal itself supports the early transmission of called data.

When the first network device receives the second message, the second message may be acquired through a registration request message or the second message may be acquired through an attachment request message. That is, the second message is carried in the registration request message or carried in the attachment request message.

In the second manner, the capability of the terminal about support or nonsupport for the early transmission of called data is acquired from the stored wireless capability set of the terminal, the capability of the terminal may be added to the wireless capability set previously, and then the wireless capability set is stored in the first network device. When the first network device transmits the first information, the first network device may search for the capability information corresponding to the terminal in the wireless capability set corresponding to the terminal stored in the first network device itself, and then add it to the first information and send the first information to the second network device.

Furthermore, the method may include the following operations.

The first network device determines whether to transmit the first information to the second network device based on the capability of the terminal about support or nonsupport for the early transmission of called data.

Moreover, if the first network device determines that the terminal has the capability of supporting the early transmission of called data, the first network device transmits the first information to the second network device; otherwise, the first network device does not transmit the first information.

The method of determining the capability of the terminal is the same as described above, and details are not described again. That is, there may be a process in which the first network device determines whether to transmit the first indication to the second network device based on the capability of the terminal; the first indication is transmitted to the second network device only when the capability of the terminal supports the early transmission of called data.

In the embodiment, when the first information is transmitted to the second network device, the first information may be carried in a paging request message transmitted to the second network device; that is, the first information is carried in the paging request message. Accordingly, the second network device acquires the first information through the paging request message.

Furthermore, the first network device can also transmit called data to the second network device.

It should be noted that the called data may be carried in the first information and transmitted to the second network device, or may not be carried in the first information.

Whether the called data is carried in the first information or not, the called data may be carried by the paging message.

In addition, in the embodiment, a manner in which the first network device determines to generate the first information can be indicated by a third network device. Specifically, at least one of called data or first indication information of whether to perform the early transmission of called data is received from the third network device.

The first indication information is used to assist the first network device in determining whether to transmit the first information to the second network device.

The third network device may be a Session Management Function (SMF) or a Serving GateWay (S-GW).

Figure 5:
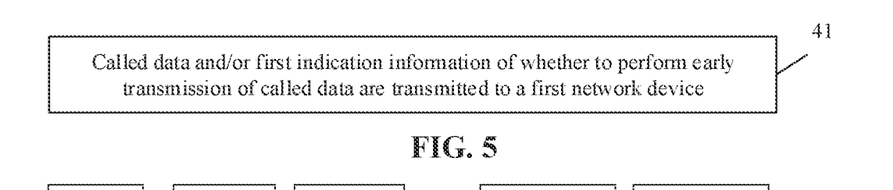
FIG. 5 is a third schematic flowchart of a data transmission method according to an embodiment of the present disclosure.

Accordingly, the processing flowchart of a third network device may be as shown in FIG. 5, which includes the following operations.

In S41: at least one of the called data or the first indication information of whether to perform the early transmission of called data is transmitted to the first network device.

The first indication information is used to assist the first network device in determining whether to transmit the first information to the second network device.

A manner in which the third network device acquires at least one of the called data or the first indication information of whether to perform the early transmission of called data may be as follows: at least one of the called data or the first indication information of whether to perform early transmission of called data is received from a fourth network device.

The method may further include whether to perform the early transmission of called data is determined based on a local policy or an acquired policy.

That is, the third network device may acquire the called data transmitted by the fourth network device. In this case, the called data can be directly transmitted to the first network device, or the third network device may determine whether to perform the early transmission of called data, and then transmit the called data and the first indication information indicating the early transmission of called data. When the third network device directly transmits the called data to the first network device, the first network device may determine whether the early transmission of called data is to be performed according to preset rule or configuration. The preset rule or configuration may be understood as that the determination is performed according to the capability of the terminal, and whether the terminal supports or not. For example, when the capability of the terminal supports, the first network device can determine to perform the early transmission of called data.

That is, the method may further include the following operations.

The third network device determines whether to transmit the first indication information to the first network device according to the capability information of the terminal.

A manner in which the third network device acquires the capability information of the terminal includes one of the following:

a capability reported by the terminal is acquired; or the capability information of the terminal is acquired from the first network device.

That is, the capability can be reported by the terminal to the third network device. Specifically, the capability can be reported to the third network device through a NAS layer process. For example, the capability is reported in a Session Management NAS (SM NAS) message. Or, the third network device may acquire the capability information of the terminal from the first network device side. For example, the third network device may transmit an identifier of the terminal and a request for acquiring the capability information of the terminal to the first network device, and then receive the capability information of the terminal transmitted from the first network device. For another example, the third network device may search directly in the information stored in the first network device and obtain the capability information of the terminal.

Or, the third network device may receive the first indication information of whether to perform the early transmission of called data transmitted from the fourth network device; and then the third network device can transmit the first indication information directly to the first network device.

Furthermore, it may also be that the third network device receives the called data and the first indication information of performing early transmission of called data, which are transmitted from the fourth network device. The third network device can transmit the called data and the first indication information directly to the first network device.

In addition, the third network device may also configure the fourth network device. For example, the third network device configures an indication of the early transmission of called data to the fourth network device. The indication may be used for the third network device to control whether the fourth network device has the capability or function of transmitting an indication of the early transmission of called data.

Furthermore, the third network device may determine whether to configure the fourth network device to indicate the early transmission of called data according to a size of called data.

The method further includes:

when a size of called data exceeds a preset threshold, it is determined not to configure the fourth network device to indicate the early transmission of called data; or when a size of called data does not exceed a preset threshold, it is determined to configure the fourth network device to indicate the early transmission of called data.

That is, when a size of called data is relatively small, it can be determined to configure the fourth network device to indicate the early transmission of called data.

For example, when the first network device is an AMF, the third network device may be the SMF, and the fourth network device, i.e., the UPF, transmits the called data and/or the first indication information of whether to perform the early transmission of called data to the SMF; The SMF transmits the called data and/or the first indication information of whether to perform the early transmission of called data to the AMF. During the session establishment process, UPF is configured by the SMF to perform or not to perform the early transmission of called data. The SMF can determine whether to perform the early transmission of called data for the session according to the local policy or the policy acquired from the PCF. If the early transmission is performed, the data is transmitted to the AMF.

Optionally, when the first network device is an MME, the third network device is the S-GW, and the fourth network device is a PDN-GW. The PDN-GW transmits the called data and/or the first indication information of whether to perform the early transmission of called data to the S-GW; The S-GW transmits the called data and/or the first indication information of whether to perform the early transmission of called data to the MME. During a PDN connection establishment process, the PDN-GW is configured to perform or not to perform the early transmission of called data. The PDN determines whether to perform the early transmission of data according to the PDN connection described in downlink data. The S-GW can determine whether to perform the early transmission of called data for the PDN connection according to the local policy or the policy acquired from the PCF. If the early transmission is to be performed, the data is transmitted to the MME.

The first network device determines whether to perform the early transmission of called data based on the following manners.

In one manner, during establishing one of a Protocol Data Unit (PDU) session, a Packet Data Network (PDN) connection, or an Evolved Packet System (EPS) bearer, it is determined whether the early transmission of called data is to be used for the one of the PDU session, the PDN connection, and the EPS bearer according to at least one of the following information:

capability information of the terminal about support for the early transmission of called data, local configuration information.

policy information of network configuration; or service data information provided by external networks.

The method further includes the following operations.

Second indication information is transmitted to the third network device, and the second indication information is used to indicate whether the early transmission of called data is to be used for one of the PDU session or the PDN connection or the EPS bearer.

Accordingly, the third network device receives the second indication information transmitted by the first network device, and the second indication information is used to indicate whether the early transmission of called data is to be used for the PDU session or the PDN connection.

Further, when called data has arrived, the third network device determines whether to transmit the called data to the first network device based on the PDU session or the PDN connection information in the called data.

Specifically, during establishing one of the PDU session, the PDN connection, or the EPS bearer, the first network device (AMF or MME) determines whether the early transmission of called data is to be used for the one of the PDU session, the PDN connection, or the EPS bearer according to at least one of the following information: capability information of the terminal about support for the early transmission of called data, local configuration information, policy information of network configuration or service data information provided by the external network, and indicates it to the third network device (SMF/S-GW entity).

When the downlink data has arrived, the third network device (SMF/S-GW entity) determines whether to transmit the data to the first network device (AMF or MME) according to information of one of the PDU session, the PDN connection, and the EPS bearer described in the data. The information of one of the PDU session, the PDN connection and the EPS bearer may be an identifier of the PDU session, an identifier of the PDN connection, and an identifier of the EPS bearer. Optionally, it may also be other information as long as it can uniquely identify the PDU session, PDN connection or the EPS bearer corresponding to the downlink data.

In another manner, the third network device may determine whether to perform the early transmission of called data, and then the third network device indicates it to the first network device, which may include the following operations.

During establishing one of the PDU session, the PDN connection, or the EPS bearer, the third network device determines whether the early transmission of called data is to be used for the one of the PDU session, the PDN connection, and the EPS bearer according to at least one of the following information:

capability information of the terminal about support for the early transmission of called data;

local configuration information;

policy information of network configuration; or service data information provided by external networks.

The first network device may further receive third indication information transmitted by the third network device, and the third indication information is used to indicate whether to perform the early transmission of called data on called data of one of the PDU session, the PDN connection, or the EPS bearer.

That is, the third network device may determine whether to transmit the first indication information to the first network device according to the capability information of the terminal. The manner in which the third network device acquires the capability of the terminal is the same as the above-described embodiments, and details are not repeated.

For example, during establishing one of the PDU session, the PDN connection, or the EPS bearer, the third network device (SMF/S-GW entity) can determine whether the early transmission of called data is to be used for the PDU session or the PDN connection according to at least one of the following information: the capability of the terminal about support for the early transmission of called data, local configuration information, policy information of the network configuration or service data information provided by the external network.

When the downlink data has arrived, the third network device (SMF/S-GW entity) determines whether to transmit the data to the first network device (AMF or MME) according to the information of one of the PDU session, the PDN connection, or EPS bearer. In addition, the information transmitted from the third network device to the first network device also needs to carry the first indication information to indicate the first network device to perform the early transmission of called data.

In addition, the first network device may further indicate whether the terminal responds to paging, and the specific processing manner may include the following manners.

First:

The first network device transmits fourth indication information; and the fourth indication information is used to indicate that the terminal needs to determine at least one of; whether to respond to paging, whether to release the terminal quickly, or whether called data is pure downlink data.

The fourth indication information may be paging indication information. That is, the first network device adds indication information of whether the terminal is required to respond to paging to the paging indication information; or, the first network device may indicate whether to release the terminal quickly or whether current called data is pure downlink data in the paging indication information.

The terminal determines whether to respond to the paging according to the fourth indication information, and if the terminal is not required to respond the paging, an uplink message of the terminal is received, and data transmission success information or terminal response information is fed back to the first network device: that is, after the second network device (i.e., the access network) receives a message of the terminal, for example, a preamble message transmitted by the terminal or an uplink RRC message transmitted by the terminal, the second network device feeds back to the first network device, i.e., the core network that the data has transmitted successfully or the terminal has responded. Accordingly, when the fourth indication information indicates that the terminal does not respond to the paging or the terminal is released quickly or the called data is pure downlink data, the first network device receives the data transmission success information or the terminal response information fed back by the second network device.

Alternatively, the first network device receives a first service request message transmitted by the terminal: and a service type of the terminal is determined based on the first service request message.

That is, after receiving early downlink data, the terminal transmits a specific type of message, such as the service request message, and after the first network device receives the specific type of message, the first network device (i.e. the core network) considers that the service request is a service of the MT-EDT type. It should be noted that the service of the MT-EDT type is only an example of a specific type of service, and there may be other specific types of services, but this embodiment is not exhaustive.

Second:

The first network device transmits fifth indication information to the second network device, and the fifth indication information is used to indicate at least one of whether to respond to paging, whether to release the terminal quickly, or whether called data is pure downlink data. Accordingly, the second network device may receive the fifth indication information from the first network device, and determine whether to respond to paging, whether to release the terminal quickly or whether called data is pure downlink data based on the fifth indication information.

That is, the first network device (i.e., the core network such as AMF or MEE) indicates at least one of whether the terminal needs to respond to paging, whether to release the terminal quickly or whether called data is pure downlink data to the second network device (i.e., access network), if the fifth indication information indicates at least one of the terminal does not need to respond to the paging, release the terminal quickly, or called data is pure downlink data, then the second network device receives the uplink message of the terminal and transmits sixth indication information to the terminal, the sixth indication information is used to indicate the terminal to return to an idle state.

The sixth indication information may be carried in an MSG2 or an MSG4.

Hereinafter, the flow of the above-described solution will be described with reference to FIG. 6 and FIG. 7. The first network device is the AMF/MME in FIG. 6 or FIG. 7, the second network device is the RAN in FIG. 6 or FIG. 7, the third network device is the SMF/S-GW in FIG. 6 or FIG. 7, and the fourth network device is the UPF/P-GW in FIG. 6 or FIG. 7.

Figure 6:
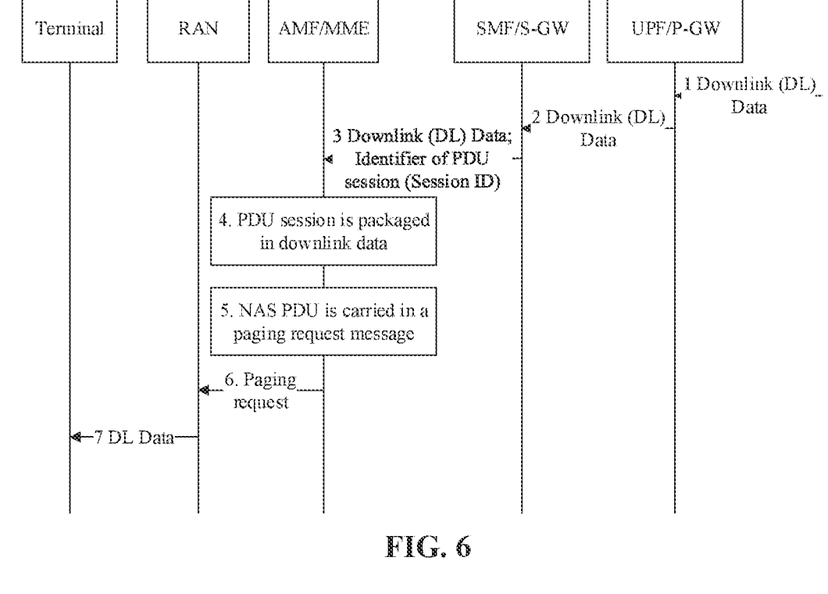
FIG. 6 is a first schematic flowchart according to an embodiment of the present disclosure.

FIG. 6 is a way of early transmission of called data for controlling plane transmission data. In the figure, called data is shown as downlink data. Specifically, 1: the UPF/P-GW acquires the downlink data; 2: the downlink data is transmitted to the SMF/S-GW; 3: the SMF/S-GW transmits the downlink data to the AMF/MME, and an identifier of PDU session may be carried in the downlink data, other contents may also be carried in the downlink data, such as an EBI, which is not exhaustive; 4: the AMF/MME packages an PDU session in the downlink data or adds the EBI to a NAS PDU: 5: the AMF/MME carries the NAS PDU in a paging request message, which can be understood as that the AMF/MME carries the first information in the paging request message; 6: the AMF/MME transmits the paging request message to the RAN; 7: the RAN transmits the downlink data to the terminal, and the downlink data may be downlink data transmitted early determined based on the first information.

Figure 7:
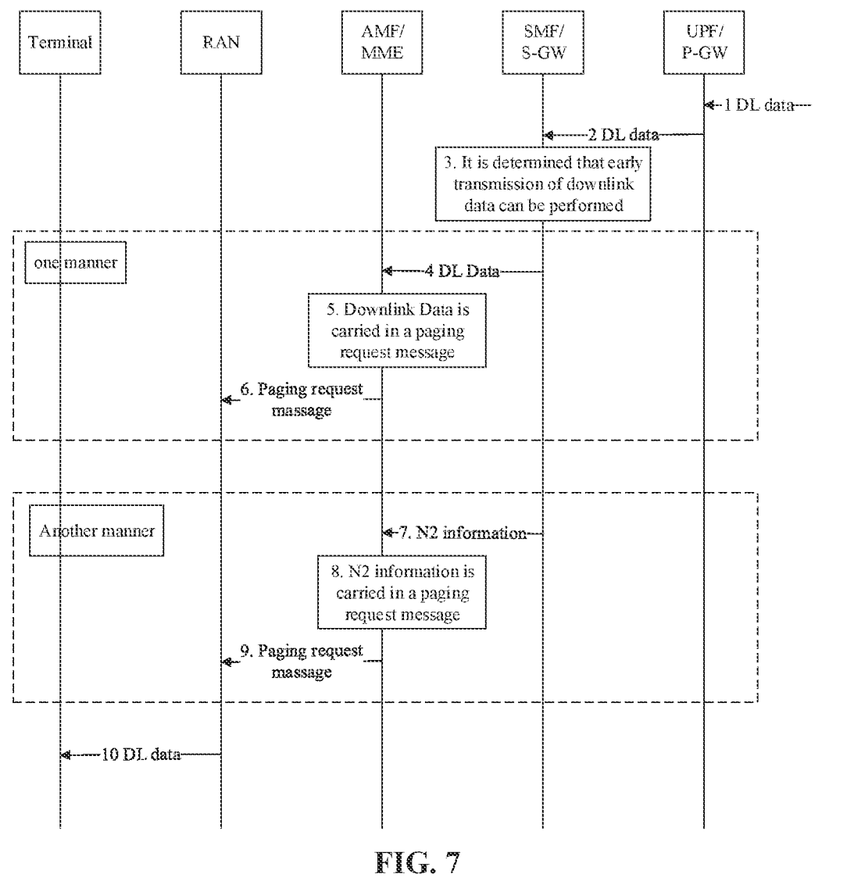
FIG. 7 is a second schematic flowchart according to an embodiment of the present disclosure.

FIG. 7 is a way of early transmission of downlink data for user plane transmission data. The DL data in the figure can be understood as called data in the present embodiment. Specifically, operations 1 and 2 are the same as described above, and details are not described again; 3: the SMF/S-GW determines that the downlink data can be transmitted early. The manner of determining that the downlink data can be transmitted early may include determining, based on the capability of the terminal, whether the capability of the terminal supports a specific type of service, such as ME-EDT service. The manner of determining the capability of the terminal also can be determined according to the local configuration.

Next, there may be two processing manners. In one manner, 4: the SMF/S-GW transmits the downlink data, and PDU session identifier/EBI/MT-EDT indication, etc. may be carried in the downlink data; 5: the AMF/MME carries the downlink data in the paging request message; 6: the AMF/MME transmits the paging request message to the RAN, the paging request message may include an NAS PDU, a PDU session identifier/EBI, etc.

In another manner, 7: the SMF/S-GW transmits N2 information, which includes the MT-EDT, indication, the PDU session identifier/EBI; 8: the AMF/MME adds the N2 information to the paging request message: 9: the AMF/MME transmits the paging request message to the RAN; 10: the RAN transmits the downlink data to the terminal.

It can be seen that by adopting the above-mentioned scheme, it is possible to determine, via first information, whether to perform early transmission of called data for a respective terminal. Thus, by means of indicating a network device to enable the network device to determine to perform the early transmission of called data for the terminal, a mechanism for the network device to perform the early transmission of called data is realized.

Figure 8:
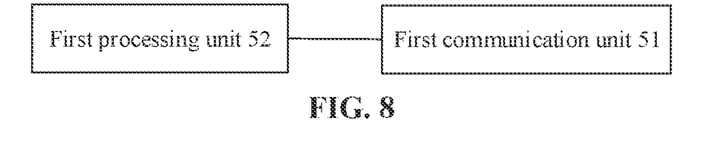
FIG. 8 is a schematic structural diagram of a first network device according to an embodiment of the present disclosure.

An embodiment of the present disclosure provides a first network device. As shown in FIG. 8, the device includes a first communication unit 51.

The first communication unit 51 is configured to transmit first information to a second network device.

The first information is used to assist the second network device in determining whether to perform early transmission of called data for a terminal.

Figure 9:
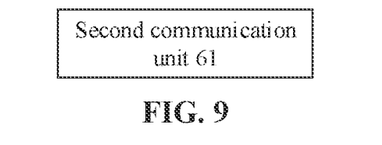
FIG. 9 is a schematic structural diagram of a second network device according to an embodiment of the present disclosure.

Accordingly, The second network device, as shown in FIG. 9, includes a second communication unit 61

The second communication unit 61 is configured to receive the first information transmitted by the first network device.

The first information is used to assist the second network device in determining whether to perform the early transmission of called data for the terminal.

In this embodiment, the first network device may be a core network device, and the second network device may be an access network device. Specifically, the first network device may be an Access and Mobility Management Function (AMF) or a Mobility Management Entity (MME); the second network device may be a radio access network (RAN), such as a base station in the RAN. Of course, other physical devices may also exist as the first network device or the second network device, no further description will be given here.

The first information includes at least one of:

indication information of whether the early transmission is applicable; that is, the first network device indicates the second network device whether to perform the early transmission of called data or capability information of terminal.

The capability information of the terminal includes: support or nonsupport for the early transmission of called data; and wireless capability information of the terminal.

Before the first network device transmits the first information, the first network device further needs to acquire the capability of the terminal, and the first network device may include a first processing unit 52.

The first processing unit 52 is configured to: receive a second message transmitted by the terminal, and determine the capability of the terminal about support or nonsupport for the early transmission of called data based on the second message, or acquire the capability of the terminal about support or nonsupport for the early transmission of called data from a stored wireless capability set of the terminal.

In the present embodiment, when the first information is transmitted to the second network device, the first communication unit 51 is configured to carry the first information in a paging request message transmitted to the second network device. That is, the first information is carried in the paging request message. Accordingly, the second network device acquires the first information through the paging request message.

Further, the first processing unit 52 of the first network device is configured to determine whether to transmit the first information to the second network device based on the capability of the terminal about support or nonsupport for the early transmission of called data.

If the terminal supports the early transmission of called data, the first information is transmitted to the second network device by the first communication unit 51. Otherwise, the first information is not transmitted.

Moreover, the first communication unit 51 of the first network device may be further configured to transmit called data to the second network device.

It should be noted that the called data may be carried in the first information transmitted to the second network device, or may not be carried in the first information.

In addition, in the present embodiment, a manner in which the first network device determines to generate the first information can be indicated by a third network device. Specifically, the first communication unit 51 is configured to receive at least one of called data or first indication information of whether to perform the early transmission of called data, transmitted by the third network device.

The first indication information is used to assist the first network device in determining whether to transmit the first information to the second network device.

The third network device may be a Session Management Function (SMF) or a Serving GateWay (S-GW).

Figure 10:
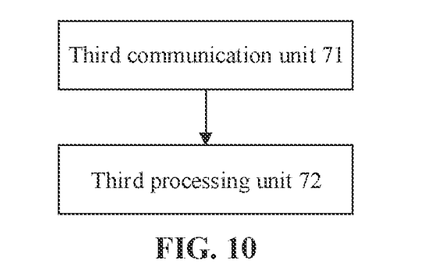
FIG. 10 is a schematic structural diagram of a third network device according to an embodiment of the present disclosure.

Accordingly, a third network device, as shown in FIG. 10, which includes a third communication unit 71.

The third communication unit 71 is configured to transmit at least one of the called data or the first indication information of whether to perform the early transmission of called data is transmitted to the first network device. The first indication information is used to assist the first network device in determining whether to transmit the first information to the second network device.

A manner in which the third network device acquires at least one of the called data or the first indication information of whether to perform the early transmission of called data may be as follows: the third communication unit 71 is configured to receive at least one of the called data or the first indication information of whether to perform early transmission of called data, transmitted by a fourth network device.

The third network device may further include a third processing unit 72, which is configured to determine whether to perform the early transmission of called data based on a local policy or an acquired policy.

That is, the third processing unit 72 of the third network device is configured to determine whether to transmit the first indication information to the first network device according to the capability information of the terminal.

A manner in which the third processing unit 72 acquires the capability information of the terminal includes one of the following:

a capability reported by the terminal is acquired via the third communication unit 71; or the capability information of the terminal is acquired from the first network device.

In addition, the third network device may also configure the fourth network device. For example, the third network device configures an indication of the early transmission of called data to the fourth network device. The indication may be used for the third network device to control whether the fourth network device has the capability or function of transmitting an indication of the early transmission of called data.

Furthermore, the third processing unit 72 of the third network device may be configured to determine whether to configure the fourth network device to indicate the early transmission of called data according to a size of called data.

The third processing unit 72 is configured to determine not to configure the fourth network device to indicate the early transmission of called data when the size of called data exceeds a preset threshold, and determine to configure the fourth network device to indicate the early transmission of called data when the size of called data does not exceed a preset threshold.

The first network device determines whether to perform the early transmission of called data based on the following manners.

In one manner, the first processing unit 52 is configured to: during establishing one of a Protocol Data Unit (PDU) session, a Packet Data Network (PDN) connection, or an Evolved Packet System (EPS) bearer, determine whether the early transmission of called data is to be used for the one of the PDU session, the PDN connection, and the EPS bearer according to at least one of the following information:

capability information of the terminal about support for the early transmission of called data;

local configuration information;

policy information of network configuration; or service data information provided by external networks.

The first communication unit 51 is configured to transmit second indication information to the third network device. The second indication information is used to indicate whether the early transmission of called data is to be used for one of the PDU session or the PDN connection or the EPS bearer.

Accordingly, the third communication unit 71 of the third network device is configured to receive the second indication information transmitted by the first network device, and the second indication information is used to indicate whether the early transmission of called data is to be used for the PDU session or the PDN connection information.

Further, the third processing unit 72 of the third network device is configured to: when called data has arrived, determine whether to transmit called data to the first network device based on the PDU session or the PDN connection information in the called data.

In another manner, the third network device may determine whether to perform the early transmission of called data, and then the third network device indicates it to the first network device, which may include the following operations.

The third processing unit 72 of the third network device is configured to: during establishing one of the PDU session, the PDN connection, or the EPS bearer, determine whether the early transmission of called data is to be used for the one of the PDU session, the PDN connection, and the EPS bearer according to at least one of the following information:

capability information of the terminal about support for the early transmission of called data;

local configuration information:

policy information of network configuration; or service data information provided by external networks.

The first communication unit 51 of the first network device is configured to receive third indication information transmitted by the third network device. The third indication information is used to indicate whether to perform the early transmission of called data on called data of one of the PDU session, the PDN connection, and the EPS bearer.

In addition, the first network device may further indicate whether the terminal responds to paging, and the specific processing manner may include the following manners.

First:

The first communication unit 51 of the first network device is configured to transmit fourth indication information. The fourth indication information is used to indicate that the terminal needs to determine at least one of: whether to respond to the paging, whether to release the terminal quickly, or whether called data is pure downlink data.

The fourth indication information may be paging indication information.

Alternatively, the first communication unit 51 of the first network device is configured to receive a first service request message transmitted by the terminal and the first processing unit 52 is configured to determine a service type of the terminal based on the first service request message.

Second:

The first communication unit 51 of the first network device is configured to transmit fifth indication information to the second network device. The fifth indication information is used to indicate at least one of: whether to respond to paging, whether to release the terminal quickly or whether called data is pure downlink data. Accordingly, the second communication unit 61 of the second network device is configured to receive the fifth indication information of the first network device, and determine whether to respond to paging, whether to release the terminal quickly or whether called data is pure based on the fifth indication information.

If the fifth indication information indicates at least one of the terminal does not need to respond to the paging, release the terminal quickly, or called data is pure downlink data, the second communication unit 61 of the second network device is configured to receive the uplink message of the terminal and transmit sixth indication information to the terminal. The sixth indication information is used to indicate the terminal to return to an idle state.

The sixth indication information may be carried in an MSG2 or an MSG4.

It can be seen that by adopting the above-mentioned scheme, it is possible to determine, via first information, whether to perform early transmission of called data for a respective terminal. Thus, by means of indicating a network device to enable the network device to determine to perform the early transmission of called data for the terminal, a mechanism for the network device to perform the early transmission of called data is realized. Therefore, data transmission efficiency is improved, signaling overhead of the system is reduced, and the system efficiency is further improved.

Figure 11:
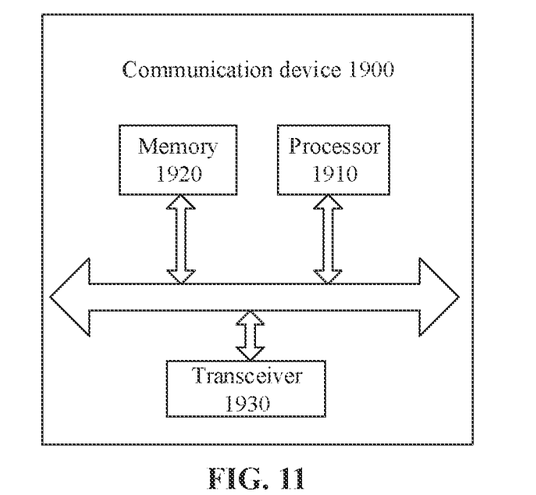
FIG. 11 is a schematic structural diagram of a network device according to an embodiment of the present disclosure.

FIG. 11 is a schematic structural diagram of a communication device 1900 provided in the embodiments of the present disclosure. The communication device in this embodiment may be specifically a network device in the foregoing embodiments. The communication device 1900 shown in FIG. 11 includes a processor 1910. The processor 1910 can invoke and run computer programs from a memory to implement the method in the embodiments of the present disclosure.

Optionally, as shown in FIG. 11, the communication device 1900 may further include a memory 1920. The processor 1910 may invoke and run computer programs from the memory 1920 to implement the method in the embodiments of the present disclosure.

The memory 1920 may be a separate device independent of the processor 1910, or may be integrated in the processor 1910.

Alternatively, as shown in FIG. 11, the communication device 1900 may also include a transceiver 1930, the processor 1910 may control the transceiver 1930 to communicate with other devices, specifically, to send information or data to other devices, or receive information or data sent by other devices.

The transceiver 1930 may include a transmitter and a receiver. The transceiver 1930 may further include an antenna(s), the number of which may be one or more.

Alternatively, the communication device 1900 may be specifically a network device of the embodiments of the present disclosure, and the communication device 1900 may implement the respective operations implemented by the network device in each method of the embodiments of the present disclosure. For the sake of brevity, it will not be elaborated here.

Alternatively, the communication device 1900 may be specifically a terminal device or a network device according to the embodiments of the present disclosure, and the communication device 1900 may implement the respective operations implemented by the mobile terminal/terminal device in each method according to the embodiments of the present disclosure. For the sake of brevity, details are not described herein.

Figure 12:
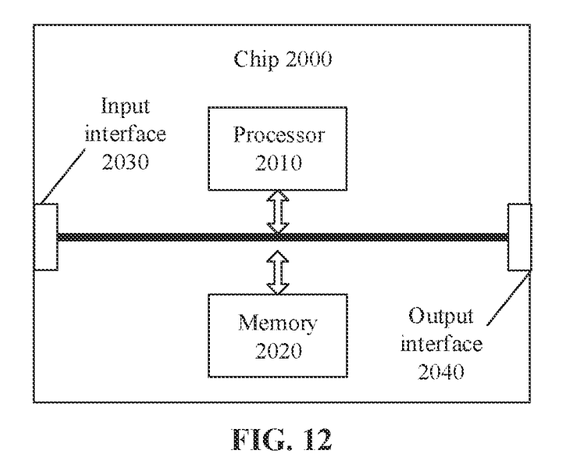
FIG. 12 is a schematic block diagram of a chip according to an embodiment of the present disclosure.

FIG. 12 is a schematic structural diagram of a chip according to the embodiments of the present disclosure. The chip 2000 illustrated in FIG. 12 includes processor 2010. The processor 2010 can invoke and run computer programs from a memory to implement the method in an embodiment of the present disclosure.

Alternatively, as shown in FIG. 12, the chip 2000 may also include a memory 2020. The processor 2010 may invoke and run computer programs from the memory 2020 to implement the method in the embodiments of the present disclosure.

The memory 2020 may be a separate device independent of the processor 2010, or may be integrated in the processor 2010.

Alternatively, the chip 2000 may also include an input interface 2030. The processor 2010 may control the input interface 2030 to communicate with other devices or chips, and specifically, may acquire information or data transmitted by other devices or chips.

Alternatively, the chip 2000 may also include an output interface 2040. The processor 2010 may control the output interface 2040 to communicate with other devices or chips, and specifically may output information or data to other devices or chips.

Alternatively, the chip may be applied to the network device in the embodiments of the present disclosure, and the chip can realize the respective operations implemented by the terminal device in each method of the embodiment of the present disclosure. For brevity, details are not described herein.

It should be understood that the chips mentioned in the embodiments of the present disclosure can also be referred to as system level chips, system chips, chip systems, on-chip system chip, or the like.

It should be understood that the processor of the embodiment of the present disclosure may be an integrated circuit chip with signal processing capability. In the implementation, the steps of the above-described method embodiments may be accomplished by integrated logic circuits of hardware in the processor or instructions in the form of software. The processor may be a general purpose processor, a Digital Signal Processor (DSP), an Application Specific Integrated Circuit (ASIC), a Field Programmable Gate Array (FPGA) or other programmable logic device, discrete gate or transistor logic device, a discrete hardware component. The methods, steps, and logical block diagrams disclosed in the embodiments of the present disclosure may be implemented or performed. The general purpose processor may be a microprocessor or the processor may be any conventional processor or the like. The steps of the method disclosed in connection with the embodiment of the present disclosure can be directly implemented by a hardware decoding processor, or by a combination of hardware and software modules in the decoding processor. The software module may be located in a storage medium mature in the art such as a random access memory, a flash memory, a read-only memory, a programmable read-only memory, or an electrically erasable programmable memory, a register, or the like. The storage medium is located in a memory, and the processor reads information in the memory and performs the steps of the above method in conjunction with its hardware.

It will be appreciated that the memory in the embodiments of the present disclosure may be volatile memory or non-volatile memory, or may include both volatile and non-volatile memory. The nonvolatile memory may be Read-Only Memory (ROM), Programmable ROM (PROM), Erasable PROM (EPROM), Electrically EPROM (EEPROM), or flash memory. The volatile memory may be a Random Access Memory (RAM), which serves as an external cache. By way of example, and not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but are not limited to, these and any other suitable types of memories.

It should be understood that the above memory is exemplary, but not limiting, and that the memory in the embodiments of the present invention may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM), and the like. That is, the memory in the embodiments of the present disclosure is intended to include, but not limited to, these and any other suitable types of memory.

Figure 13:
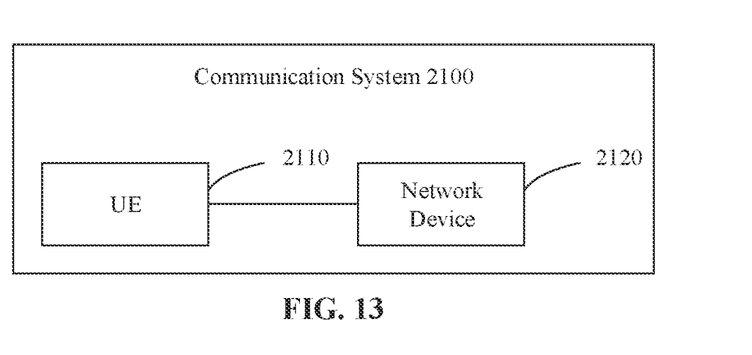
FIG. 13 is a second schematic diagram of a communication system architecture according to an embodiment of the present disclosure.

FIG. 13 is a schematic block diagram of a communication system 2100 provided by the embodiments of the present disclosure. As shown in FIG. 13, the communication system 2100 includes User Equipment (UE) 2110 and a network device 2120.

The UE 2110 may be used to implement the corresponding functions implemented by the terminal device in the above-mentioned method, and the network device 2120 may be used to implement the corresponding functions implemented by the network device in the above-mentioned method. For brevity, details are not described herein.

An embodiment of the present disclosure further provides a computer readable storage medium for storing computer programs.

Alternatively, the computer-readable storage medium may be applied to the network device in the embodiment of the present disclosure, and the computer program causes the computer to perform the corresponding flow implemented by the network device in the respective methods of the embodiments of the present invention, and details are not described herein for brevity.

An embodiment of the present disclosure also provides a computer program product including computer program instructions.

Alternatively, the computer program product may be applied to the network device in the embodiments of the present disclosure, and the computer program instructions cause the computer to perform the corresponding flow implemented by the network device in the respective methods of the embodiments of the present invention, and details are not described herein for brevity.

An embodiment of the present disclosure also provides a computer program.

Alternatively, the computer program may be applied to the network device in the embodiments of the present disclosure. The computer program, when being run on a computer, causes the computer to execute the corresponding flow implemented by the network device in the respective methods in the embodiment of the present disclosure. For brevity, details are not described herein.

Those of ordinary skill in the art will recognize that the elements and algorithm steps of the examples described in connection with the embodiments disclosed herein can be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be beyond the scope of the present disclosure.

By adopting the above-mentioned scheme, whether to perform early transmission of called data for a respective terminal can be determined based on first information. As such, by indicating a network device to enable the network device to determine to perform the early transmission of called data for the terminal, a mechanism for the network device to perform the early transmission of called data is provided, thereby improving data transmission efficiency, reducing signaling overhead of the system, and further improving the system efficiency.

It will be apparent to those skilled in the art that for the convenience and brevity of the description, reference may be made to the corresponding processes in the foregoing method embodiments for the specific working procedures of the above-described systems, apparatuses and units, and details will not be described herein.

In several embodiments provided by the present disclosure, it should be understood that the disclosed systems, devices, and methods can be realized in other ways. For example, the device embodiments described above are merely illustrative, for example, the division of the unit is merely a logical functional division, and there may be additional division in practice, for example, multiple units or components can be combined or integrated into another system, or some features may be ignored or not performed.

On the other hand, the coupling or direct coupling or communication connection between each other shown or discussed may be indirect coupling or communication connection through some interfaces, devices or units, and can be in electrical, mechanical or other form.

The elements illustrated as separate elements may or may not be physically separate, and the elements shown as elements may or may not be physical elements, may be located at one location, or may be distributed across multiple network elements. Some or all of the elements may be selected according to actual needs to achieve the objectives of the embodiments.

In addition, the functional units in the various embodiments of the present invention may be integrated in one processing unit, may be separate physical units, or may be integrated in two or more units.

The functions, if implemented as software functional units and sold or used as separate products, may be stored in a computer-readable storage medium. On the basis of such an understanding, the technical solution of the present invention essentially or the part that contributes to the prior art or the part of the technical solution can be embodied in the form of a software product, which is stored in a storage medium and includes instructions for causing a computer device (which may be a personal computer, a server, a network device, or the like) to perform all or part of the steps of the methods described in the various embodiments of the present disclosure. The aforementioned storage medium includes a USB flash drive, a removable hard disk, Read-Only Memory (ROM). Random Access Memory (RAM), a magnetic disk, an optical disk or other media that can store program codes.

The foregoing description is merely illustrative of the embodiments of the present disclosure, but the scope of protection of the present invention is not limited thereto. Variations or substitutions may readily occur to those skilled in the art within the technical scope of the present disclosure, and are intended to be included within the scope of protection of the present invention. Accordingly, the scope of the present invention should be described with reference to the scope of the claims.

The invention claimed is:

1. A data transmission method, performed by a first network device, the method comprising:
   during establishing a Packet Data Network, PDN, connection, determining whether an early transmission of downlink data is to be used for the PDN connection according to at least one of the following information:
      capability information of the terminal about support for an early transmission of called data,
      local configuration information, or
      service data information provided by external networks; and
   receiving, by the first network device, first indication information of whether to transmit first information to a second network device,
      wherein the first indication information includes a size of called data;
   determining, by the first network device and based on the received first indication information, to transmit the first information to the second network device;
   upon determining to transmit the first information, generating, by the first network device, the first information based on the size of called data by comparing the size of called data with a preset threshold, wherein the first information is configured to assist the second network device in configuring its early transmission of downlink data for a terminal, wherein the first network device is a mobility management entity, MME, or an access and mobility management function, AMF, and wherein the second network device is a radio access node, RAN; and transmitting the first information to the second network device, wherein the method further comprises:

receiving a second message transmitted by the terminal, and determining, based on the second message, capability of the terminal about support or nonsupport for the early transmission of called data; and determining whether to transmit the early transmission of called data for the terminal according to service data information provided by an external network.

2. The method of claim 1, further comprising:
acquiring the capability of the terminal about support or nonsupport for the early transmission of downlink data from a stored wireless capability set of the terminal.

3. The method of claim 1, wherein transmitting the first information to the second network device comprises:
carrying the first information in a paging request message transmitted to the second network device.

4. The method of claim 1, further comprising:
receiving, from a third network device, at least one of: called data, or the first indication information of whether to perform the early transmission of called data,
wherein the first indication information is used to assist the first network device in determining whether to transmit the first information to the second network device.

5. The method of claim 1, further comprising:
during establishing the PDN connection, determining whether the early transmission of downlink data is to be used for the PDN connection according to policy information of network configuration.

6. The method of claim 5, further comprising:
transmitting second indication information to a third network device, wherein the second indication information is used to indicate whether the early transmission of downlink data is used for the PDN connection.

7. The method of claim 5, further comprising:
transmitting fifth indication information to the second network device, wherein the fifth indication information is used to indicate at least one of:
whether to respond to paging;
whether to release the terminal quickly; or
whether called data is pure downlink data.

8. A first network device comprising:
a processor;
a memory for storing computer programs; and
a transceiver,
wherein the processor is configured to execute the computer programs stored in the memory to:
during establishing a Packet Data Network, PDN, connection, determine whether an early transmission of downlink data is to be used for the PDN connection according to at least one of the following information:
capability information of the terminal about support for an early transmission of called data,
local configuration information, or
service data information provided by external networks; and
receive, by the first network device, first indication information of whether to transmit first information to a second network device,
wherein the first indication information includes a size of called data;
determine, by the first network device and based on the received first indication information, to transmit the first information to the second network device;
upon determining to transmit the first information, generate, by the first network device, the first information based on the size of called data by comparing the size of called data with a preset threshold,
wherein the first information is configured to assist the second network device in configuring its early transmission of downlink data for a terminal, wherein the first network device is a mobility management entity, MME, or an access and mobility management function, AMF, and wherein the second network device is a radio access node, RAN; and
transmit the first information to the second network device via the transceiver,
wherein the processor is further configured to execute the computer programs stored in the memory to receive, via the transceiver, a second message transmitted by the terminal, and determine, based on the second message, capability of the terminal about support or nonsupport for the early transmission of called data, and
wherein the processor is further configured to determine whether to transmit the early transmission of called data for the terminal according to service data information provided by an external network.

9. The first network device of claim 8, wherein
the processor is further configured to execute the computer programs stored in the memory to acquire capability of the terminal about support or nonsupport for the early transmission of called data from a stored wireless capability set of the terminal.

10. The first network device of claim 8, wherein the processor is further configured to carry the first information in a paging request message transmitted to the second network device.

11. The first network device of claim 8, wherein the processor is further configured to receive, from a third network device, at least one of: called data, or the first indication information of whether to perform the early transmission of called data,
wherein the first indication information is used to assist the first network device in determining whether to transmit the first information to the second network device.

12. The first network device of claim 8, wherein the processor is further configured to, during establishing the PDN connection, determine whether the early transmission of downlink data is to be used for the PDN connection according to policy information of network configuration.

13. The first network device of claim 12, wherein the processor is further configured to transmit, via the transceiver, second indication information to a third network device, wherein the second indication information is used to indicate whether the early transmission of downlink data is used the PDN connection.

* * * * *